July 6, 1926.
I. A. WEAVER
TIRE CHANGER
Filed March 5, 1923
1,591,193
2 Sheets-Sheet 1
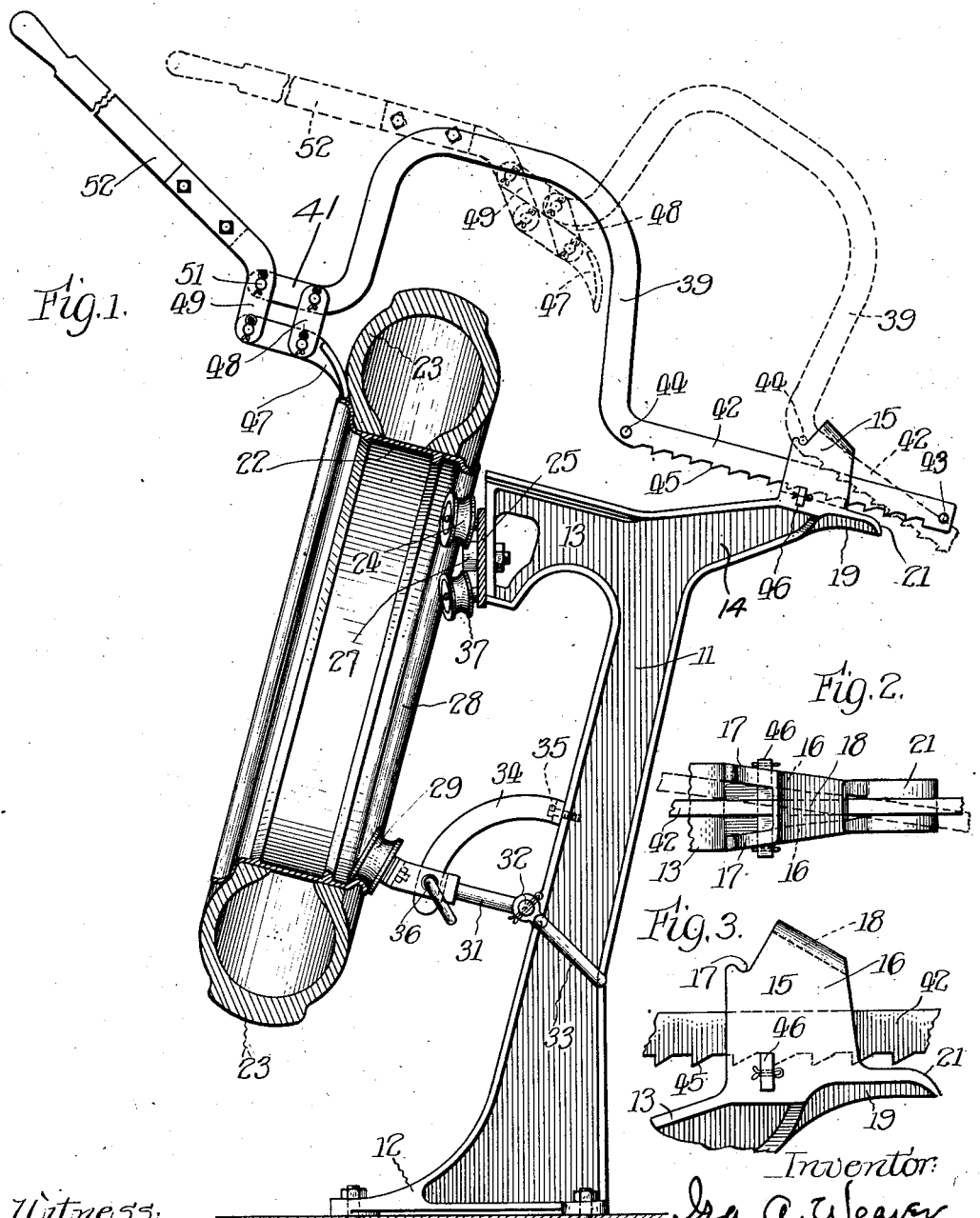

July 6, 1926. 1,591,193
I. A. WEAVER
TIRE CHANGER
Filed March 5, 1923 2 Sheets-Sheet 2
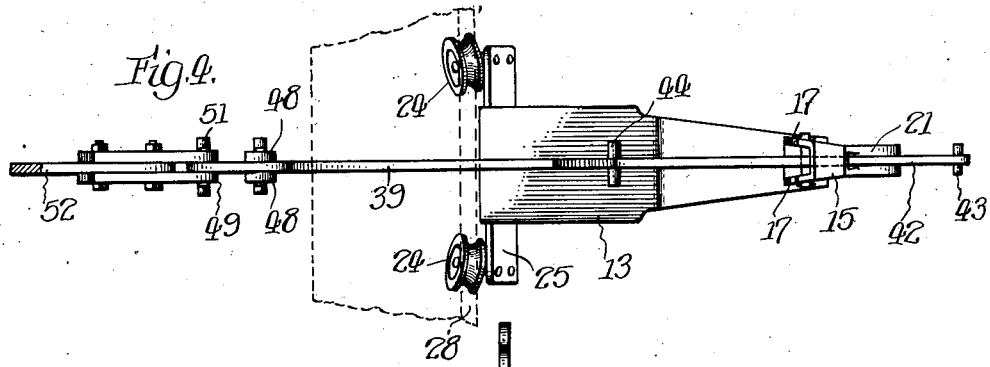
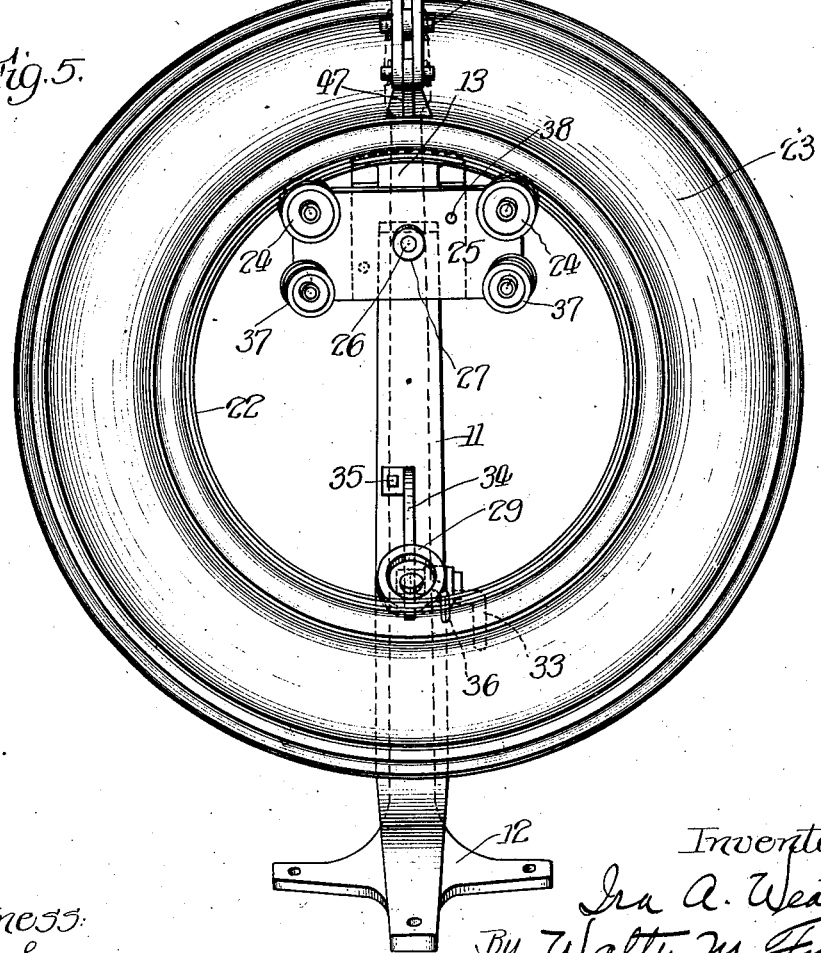
Witness:
A. J. Sauser
Inventor:
Ira A. Weaver
By Walter M. Fuller
Atty.

Patented July 6, 1926.

1,591,193

UNITED STATES PATENT OFFICE.

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

TIRE CHANGER.

Application filed March 5, 1923. Serial No. 622,773.

My invention pertains to improvements in means for facilitating the changing of tires, especially pneumatic tire-casings, on rims, wheels, and the like, and is designed particularly to assist in this work in connection with heavy pneumatic tires of relatively large sizes.

One object of the invention is to provide a simple means which will free the casing from the rim or wheel as the case may be and which is capable of exerting considerable force along this line without undue effort on the part of the operator.

A further aim of the invention is the production of an appliance of this type wherein it is not necessary to lift or elevate the rim and tire to any considerable degree which is objectionable because of their weight.

An added purpose of the invention is to supply a tire-changer occupying comparatively little floor space.

Another design of the invention is to equip the appliance with simple means for turning the rim and tire around to bring its several sections successively into the field of action of the tire-removing or freeing means.

To enable those skilled in this art to have a full and complete understanding of the invention and the advantages resulting from its employment, in the accompanying drawings throughout the several views of which like reference characters refer to the same parts I have illustrated a desirable and preferred embodiment of such invention.

In these drawings:

Figure 1 is an elevation of the new appliance with certain parts shown in section and other parts shown in inoperative position in dotted lines;

Figure 2 is a fragmentary plan view of the mounting for the arm which carries the tire pressing or freeing finger or dog;

Figure 3 is an elevation of that portion of the appliance shown in Figure 2;

Figure 4 is a fragmentary plan view of the machine, and

Figure 5 is a front elevation of the same with a rim and tire mounted thereon.

The new appliance includes a slightly rearwardly inclined standard 11 having a base 12 adapted to be fastened in any approved manner to a floor or platform, the upper portion of such standard having a forwardly-projecting part 13 and a rearwardly-extended section 14 having an upstanding socket 15 with forwardly-flaring or diverging side walls 16, 16, spaced apart somewhat at their rear edges, such socket having aligned notches or recesses 17 at the front portion of the top edges of the socket side walls, and with an inclined top wall 18 connecting the side walls together, the backwardly-projecting extension 19 to the rear of the socket having a rearwardly, downwardly-curved, top, bearing surface 21.

The vehicle-wheel rim 22, bearing the pneumatic tire-casing 23 to be removed therefrom, is supported by means of a pair of spaced, grooved rollers 24, 24, revolubly mounted on forwardly-extended studs on a plate 25 adjustably held against the front plane face of the part 13 of the standard by a screw 26 and nut 27, the channeled or double-flanged peripheries of these anti-friction supporting-rollers receiving the circular bead or internal rib 28 of the rim, the lower portion of the latter being held in place, so that the rim as a whole and its tire are inclined or sloped rearwardly, as is clearly shown in Figure 1, by a similar, tilted, grooved roller 29 revolubly mounted on the front end of an apertured arm 31 fulcrumed at 32 on the standard and equipped with a bent operating handle 33.

A plain segment or curved member 34 is fixedly mounted on the standard at 35 and extends down through the aperture in arm 31, the latter being fitted with a tightening or set-screw or screw-clamp 36 so that the arm 31 and its roller 29 may be readily adjustably secured in any desired or required position.

Thus the rim and its tire are mounted on the standard in an inclined position in such an anti-friction manner that they may be readily turned on their supporting rollers.

For lighter rims or those having different shaped beads or ribs, the plate 25 on its lower portion is equipped with another pair of spaced grooved rollers 37, 37 and these may be brought into operative position by loosening the nut 27, turning the plate halfway around, and again tightening the nut, such movement of the plate shifting the other rollers 24, 24 downwardly out of the way into inoperative position.

In order to locate the plate accurately for these two different positions of the rollers, it may be fitted with a locking pin or ball 38 adapted to fit in appropriately located recesses in the face of the standard.

The device includes also a bent or vertically-arched bar 39 having a relatively-short, straight, front part 41 and a long, straight, back portion 42, the latter extending rearwardly through the socket member 15 and having a cross-pin 43 at its rear end designed by its engagement with the socket member to prevent unintentional forward withdrawal of the bar from the socket.

Bar 39, near the junction of its arched and rear straight portions, has a second cross-pin 44 extended laterally from both of its faces and intended when resting in the seats or saddles 17, 17 of the socket member to hold the bar in elevated inactive position, as shown in dotted lines in Figure 1, the top edge of the bar also at this time bearing against the under surface of the socket top wall 18.

Along its lower edge, the part 42 of the bar is supplied with a series of ratchet-teeth 45 with abrupt front faces and sloping rear surfaces.

These teeth are designed to coact with a cross-pin or bar 46 extended across the lower portion of the socket and through holes in the side-walls of the socket member.

Thus when one of the ratchet-teeth engages the cross-block 46, the bar 39 is prevented from moving forwardly, unless intentionally lifted, but it may be shifted rearwardly to any new position of adjustment without elevation thereof, due to the inclined faces of the teeth.

When the bar is being slid forwardly over the stop element or abutment 46 in raised position, it bears on the curved surface 21 on which it readily slides.

In front of the rim and its pneumatic tire-casing, the arm section 41 is supplied with a downwardly-curved, more or less pointed finger or dog 47 mounted on the part 41 by a short link 48 and pivoted to the lesser arm 49 of a bell-crank lever fulcrumed on element 41 at 51 and having a major arm 52 constituting a forwardly-extended, operating handle, the two parts 48 and 49 desirably being of the same length to constitute a parallel-motion mounting for the dog or finger.

The shape of the element 47 is such as to facilitate its insertion between the bead portion of the tire-casing and the flange of the rim to separate them if they are "frozen" together.

Such new appliance works practically as follows:—

Assuming that a rim and its tire have been mounted on the supporting rollers, as indicated in Figures 1 and 5, while the arm 39 is held elevated in the dotted line position shown in Figure 1 by the engagement of the pin 44 in the recesses or seats 17 and the bearing of the top edge of the part 42 of the bar against the under face of the socket top-wall, then the operator, by grasping the handle 52, releases the arm from its temporary supports and brings it down and forwardly causing the proper ratchet-tooth to bear against the cross-block or cross-bar 46, whereupon he causes the finger or dog to engage the outer or front face of the tire-casing and by downward pressure on the handle he forces the dog rearwardly and slightly downwardly under great leverage and frees the tire from the rim at that point.

Owing to the permissible lateral swing of the dog-bearing arm, the pressure may be exerted on the tire at a plurality of points before it becomes necessary to turn the rim and tire somewhat on the rollers to bring a new section of the tire into the field of action of the dog or finger.

Inasmuch as the rim is free to turn on the supporting anti-friction rollers and the curved or arched arm or bar has a considerable lateral movement or play in the flaring socket, the rim and its tire may be turned on the rollers by moving the handle sidewise while the pressure is being applied or a new section of the rim and tire may be turned into place before excessive pressure is exerted.

In this way the successive sections of the tire are freed from the rim and the top of the part 13 of the standard is adapted to receive and support the removed tire until the rim is demounted, whereupon it can be lifted off.

Obviously, the inclination of the rim and tire assists in the removal of the latter because the pressure exerted thereon by the dog has a downward component and the freed tire more readily slides on to the supporting arm 13 by reason of its weight, that is to say, by reason of the action of gravity thereon.

Such combined backward and downward pressure or leverage exerted on the dog aids in its insertion or introduction between the flange of the rim and the bead of the tire-casing, which is usually or at least sometimes necessary to effect the demounting of the casing from its rim.

Owing to the fact that none of the operating mechanism extends through the rim, the appliance is equally well-adapted for removing tire-casings from wire or other wheels as there is nothing to interfere with their spokes or hubs.

Those skilled in this art will readily understand that the invention is not limited and restricted to this precise and exact embodiment but that many minor mechanical changes may be incorporated therein without departure from the heart and essence of the invention and without the sacrifice of any of its practical and substantial benefits and advantages.

I claim:

1. In a tire-changer, the combination of a standard, means to support a rim and its tire on said standard in a general upright position and with capacity for rotation about their common axis, a tire-tool adapted to engage the tire, a mounting for said tire-tool permitting the latter to have limited play only around the axis of the supported rim and tire and to move toward and from the tire to permit the removal of the tire from the rim by force applied manually and by cooperation with the rim and tire to effect their manual rotation about their axis to bring new portions of the tire into the restricted field of action of said tire-tool.

2. In a tire-changer, the combination of a standard, a plurality of anti-friction rollers on said standard adapted to support a rim and its tire in an inclined position, a tire-tool adapted to engage the tire, and a mounting for said tire-tool permitting the latter to have limited play only around the axis of the rim and tire while they are supported on said rollers and to move toward and from the tire to permit the removal of the tire from the rim by force applied manually and by cooperation with the supported rim and tire to effect their manual rotation about their axis to bring new portions of the tire into the restricted field of action of said tire-tool.

3. In a tire-changer, the combination of a standard, means thereon to support a rim and its tire in an inclined plane, means to force the tire from the rim while thus supported, and means projecting forwardly from said standard adjacent to the supported rim to receive and sustain the removed tire.

4. In a tire changer, the combination of a standard, a plurality of anti-friction rollers thereon arranged to rotatably support a rim and its tire inclined upwardly rearwardly, means on said standard back of the supported rim and tire to receive and sustain the removed tire, and manually-operated means to force the tire from the rim while thus supported and turned on said rollers.

5. In a tire changer, the combination of a standard, a plurality of anti-friction rollers thereon arranged to rotatably support a rim and its tire inclined upwardly rearwardly, means on said standard back of the supported rim and tire to receive and sustain the removed tire, and manually-operated means to force the tire rearwardly from the rim at successive points as the rim and tire are turned on the rollers to bring new portions of the tire into the field of action of said forcing means, the latter being constructed and mounted to effect turning of the rim and tire on the rollers by engagement therewith.

6. In a tire changer, the combination of a standard, anti-friction means thereon arranged to support a rim and its tire, means on said standard to receive and sustain the removed tire, and manually-operated means mounted with a limited play around the rim to force the tire from the rim at successive points as the rim and tire are turned on the anti-friction means to bring new portions of the tire into the field of action of said forcing means, the latter being constructed and mounted to effect turning of the rim and tire on the anti-friction means by engagement therewith.

7. In a tire changer, the combination of a standard, means to support a rim and its tire thereon with capability of turning about their common axis, means on said standard to the rear of said rim and tire to receive and sustain the removed tire, a dog, means to force said dog rearwardly against the tire to remove the latter from the rim, and a mounting for said dog permitting it to play laterally to a limited degree only whereby to give it a substantial field of action on the tire before turning of the latter is required to bring a new portion thereof into the field of action of the dog.

8. In a tire changer, the combination of a standard, means to support a rim and its tire thereon with capability of turning about their common axis, a dog at the front of the tire, a mounting for the dog extended around the outside of the tire and giving the dog a lateral play whereby to afford it a substantial field of action on the tire before turning of the latter is required to bring a new portion thereof into the field of action of the dog, and means to force the dog against the tire.

9. In a tire changer, the combination of a standard, means to support a rim and its tire rotatably thereon in a general upright position, an arm extended across the plane of the tire and outside of its periphery, a mounting for said arm on said standard to the rear of said rim supporting means permitting the arm to move toward and away from the tire and to move laterally to a limited degree only, a dog mounted on said arm adapted to press against the front face of the tire, and means on said arm to force such dog against the tire to dislodge the latter from the rim.

10. In a tire changer, the combination of a standard, means to support a rim and its tire rotatably thereon in a general upright position, an arm extended across the plane of and outside of the periphery of the tire thus supported, a mounting for said arm on said standard to the rear of said rim supporting means permitting the arm to move toward and away from the tire and to move laterally to a limited degree only, a dog having a parallel motion mounting on said arm adapted to press against the front face of the tire, and power multiplying means to force the dog toward the tire.

11. In a tire changer, the combination of a standard, means to support a rim and its tire rotatably thereon in a general upright position, an arm extended across the plane of and outside of the periphery of said tire, a mounting for said arm on said standard to the rear of said rim supporting means permitting the arm to move toward and away from the tire and to move laterally to a limited degree only, a dog mounted on said arm adapted to press against the front face of the tire, and means on said arm in front of the tire to force said dog toward the tire to dislodge the latter from the rim.

12. In a tire changer, the combination of a standard, a plurality of anti-friction rollers on said standard adapted to support a rim and its tire inclined upwardly rearwardly and to permit their turning on the rollers, said standard to the rear of the supported rim and tire having means to receive and sustain the removed tire and having a forwardly-flaring socket equipped with a cross abutment, an operating arm extended through said socket and having a series of ratchet teeth adapted to individually engage said abutment to adjustably position said arm against unintentional forward movement, the flaring character of the socket permitting lateral play of the arm, a dog at the front of the tire, a parallel motion mounting for said dog on said arm, and lever means to operate said dog to force it toward the tire to effect the removal of the latter from the rim, the side play of the arm permitting the dog to act on a substantial portion of the tire before turning of the rim is necessary.

13. In a tire-changer, the combination of means to support a rim and its tire with capacity for rotation about their common axis, a tire-tool adapted to engage one side of the supported tire, and a mounting for said tire-tool supported on the opposite side of the supported tire and permitting the tire-tool to have limited lateral play only around the axis of the supported rim and tire and constructed to permit the tire-tool to move toward and from the tire to effect its removal from the rim by force applied manually thereto and by cooperation with the rim and tire through the play specified to produce their manual rotation about their axis to bring new portions of the tire into the restricted field of action of said tire-tool.

In witness whereof I have hereunto set my hand and seal.

IRA A. WEAVER. [L. S.]